June 29, 1926.

J. E. ROBBINS

HAY BALER

Filed June 4, 1920

Witness
Frank A. Sahle

Inventor
John E. Robbins,
By Hood & Schley
Attorneys

June 29, 1926.
J. E. ROBBINS
HAY BALER
Filed June 4, 1920
1,590,319
7 Sheets-Sheet 5

June 29, 1926.

J. E. ROBBINS

1,590,319

HAY BALER

Filed June 4, 1920

Witness
Frank A. Sable

Inventor
John E. Robbins,

Hood & Schley
Attorneys

June 29, 1926.

J. E. ROBBINS

1,590,319

HAY BALER

Filed June 4, 1920

Witness
Frank A. Sable

Inventor
John E. Robbins,
By Hood Schley
Attorneys

Patented June 29, 1926.

1,590,319

UNITED STATES PATENT OFFICE.

JOHN E. ROBBINS, OF GREENSBURG, INDIANA.

HAY BALER.

Application filed June 4, 1920. Serial No. 386,566.

The object of my invention is to produce improved mechanism for applying binding wires to bales of hay or other similar material, in the process of production of such bales.

The accompanying drawings illustrate my invention.
Fig. 1 is a side elevation in partial vertical section of an apparatus embodying my invention;
Fig. 2 is a fragmentary detail of one of the trip mechanisms;
Fig. 8 a sectional detail of one of the clutch mechanisms;
Fig. 9 a side elevation in partial vertical section, of the parts shown in Fig. 8;
Fig. 13 a horizontal section, on a larger scale, through one of the twister heads;
Fig. 14 a fragmentary elevation of one of the twister heads;
Fig. 15 a perspective detail of the completed twister;
Fig. 16 a perspective detail of the wire-cutting and holding mechanism, in the position immediately following the final packing of the bale;
Fig. 17 a fragmentary section of the cutting and holding head, in an intermediate position, immediately following the cutting of the wire;
Fig. 18 a fragmentary detail, on a much smaller scale, of means for driving the cutter head;
Fig. 22 a fragmentary perspective detail of a slight modification.

In the drawings, 30 indicates the bale-forming end of the main frame, comprising the hopper 31 and the bale guides 32, leading therefrom. Reciprocably mounted in the main frame, so as to traverse the hopper and enter the guides 32, is a packer head 33, reciprocated by any suitable means, such, for instance, as pitman 34.

Thus far, the construction is common and well known and needs no further description.

A transverse gap 35, the purpose of which will be made to appear, exists between the delivery end of hopper 31 and the receiving end of guides 32 and adjacent the delivery side of the hopper, I arrange a stationary cutter bar 36, immediately above horizontal guides 37, a reciprocating cutter plate 38 being mounted in these guides so as to traverse the mouth of the hopper and cooperate with the cutter blade 36 upon each reciprocation of the packer plunger 33, plate 38 being connected by parts 39 with the packer head.

Arranged in the gap 35 are transverse guideways 41, in which is supported a reciprocating plate 42, provided with two vertically-spaced arms 43, each of which carries a grooved wheel 44. This grooved wheel 44 is arranged in a horizontal plane and is formed to have the binding wire 45 pass around it, a small wheel 46 being arranged closely adjacent wheel 44, for a purpose which will appear.

Journaled in a vertical bar 50, or main plate, adjacent gap 35 and substantially in the same horizontal plane with each wheel 44, is a shaft 51, which carries a cutter head 52, formed, in the present instance, with six circumferentially-spaced radial cutters which are adapted to cooperate with the end of a stationary cutter plate 54, secured to one face of bar 50.

Each shaft 51 also carries a holder head 55 which comprises six radial fingers A, B, C, D, E and F, which correspond to the six cutter fingers of the cutter head 52, the cutter fingers being set slightly in advance of the fingers of the holder head 55. A wear plate 56 is placed between bar 50 and the holder head 55 and the adjacent portion of each of the fingers of the holder head is grooved, as indicated at 57 (Fig. 17) to permit wire 45 to lie between the holder head finger and plate 56.

Head 55 is circumferentially grooved, as indicated at 58, so that a stripper finger 59 may be projected into said groove and serve to strip portions of wire 45 from head 55 in a manner which will be described.

Bar 50 is notched at 60 and plate 56 is notched at 61 to correspond with notch 53 of the cutter plate 54.

Figures 12, 13, 14, 15:
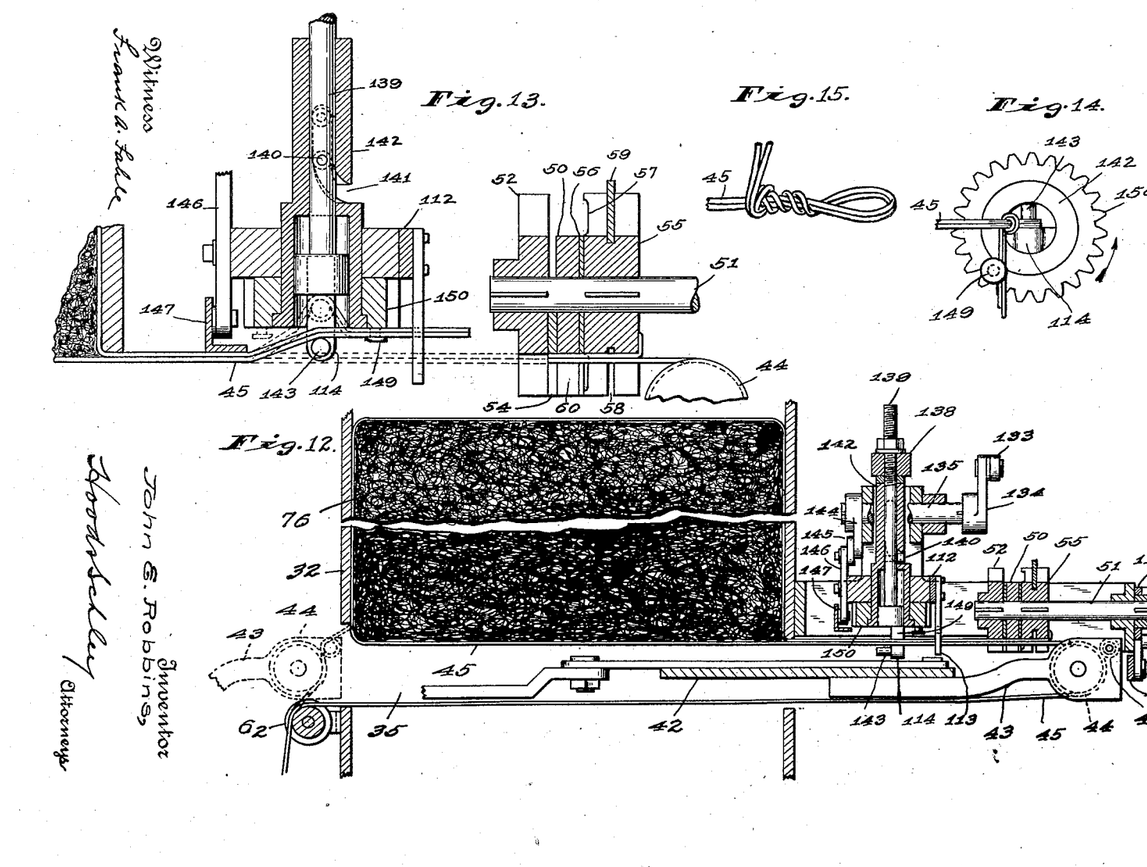

The initial end of wire 45 lies between finger B (Fig. 19) of head 55 and plate 56 and is passed from thence beneath said finger and around wheel 44 which is projected through gap 35 to the position shown in Fig. 12. Wire 45 passes from thence back through gap 35 around an idler 62 to the supply roll 63 which is mounted on a suitable pin 64 on the side of the hopper and is subject to the resistance offered by a compression spring 65.

Figures 19, 20, 21:
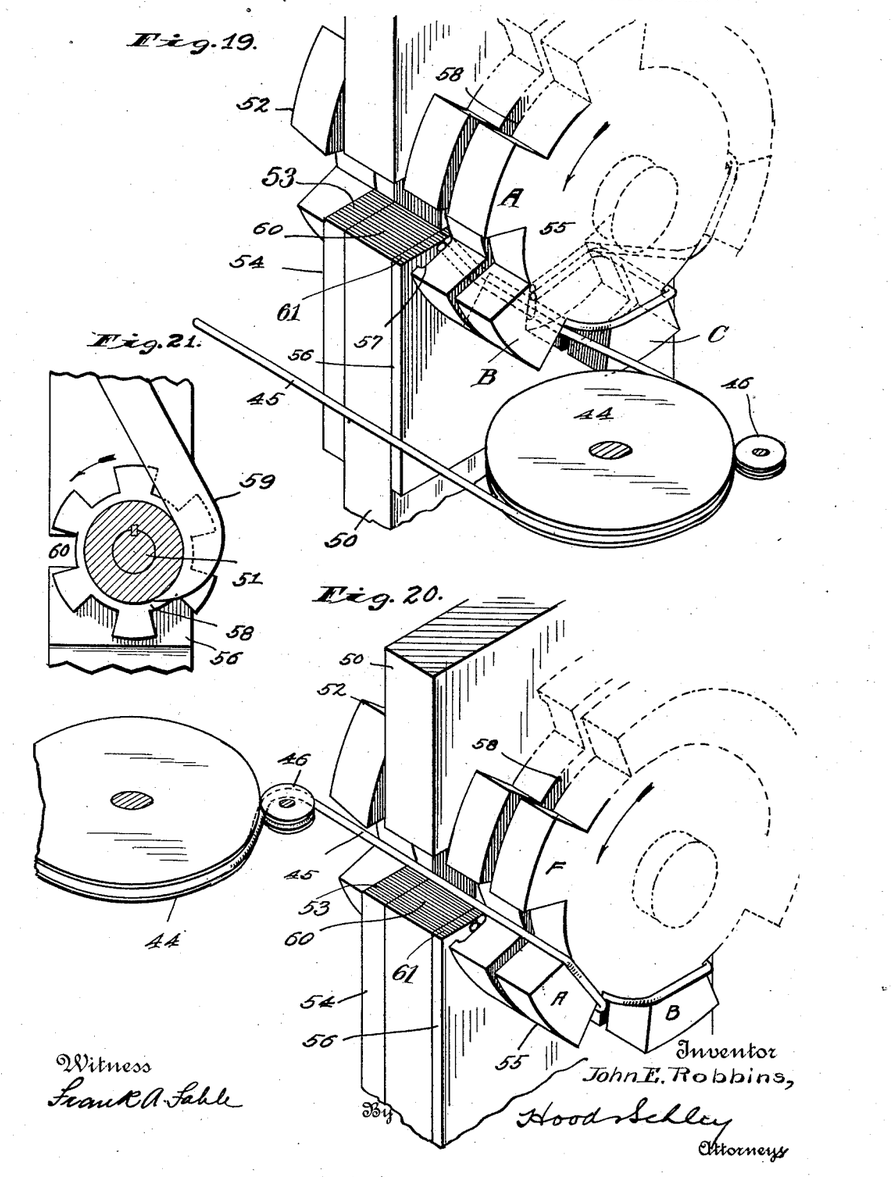
Fig. 19 a view similar to Fig. 16 with the parts in the position immediately preceding the return of the wire-distributing head.
Fig. 20 a view similar to Fig. 19, showing the parts in the position immediately following the beginning of the return movement of the distributing head.
Fig. 21 a fragmentary section, on a smaller scale, showing the stripper finger in conjunction with the wire-holding head.

With the parts in the position shown in Fig. 19, plate 42 is drawn back through gap 35, by a mechanism which will be described, until wheel 44 occupies the position shown in dotted lines at the left of Fig. 12, this movement passing wire 45 over the top of finger A of head 55, through notches 61, 60 and 53, and between two of the cutters of head 52, the wire being looped around wheel 46, as shown in Fig. 20. This movement stretches wire 45 across the mouth of guide 32.

The material to be baled is deposited in hopper 31 and successive quantities are driven by packer head 33 through the hopper against wires 45 and into guide 32, the wires 45 being thus drawn from rolls 63 into the guides 32 so as to be wrapped around three sides of the bale, as indicated in Fig. 12.

Figures 1, 2:
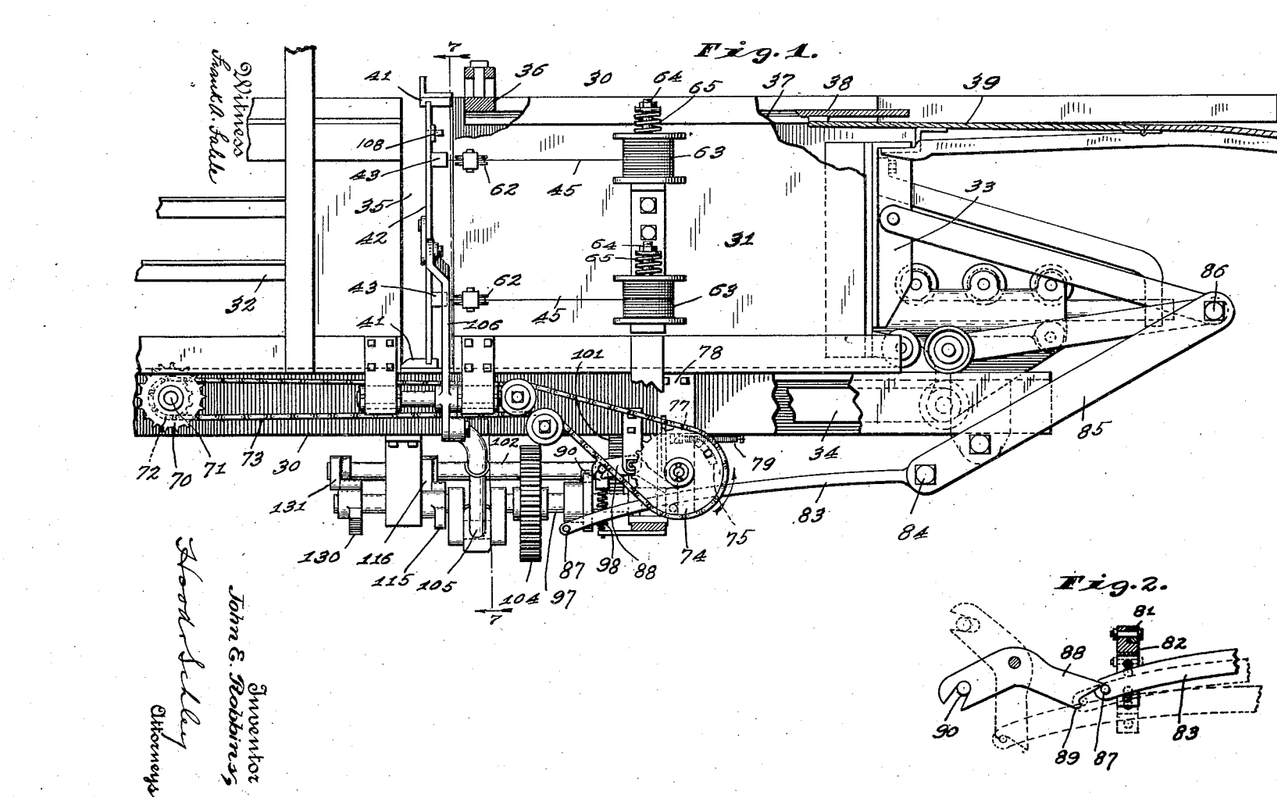
Figure 3:
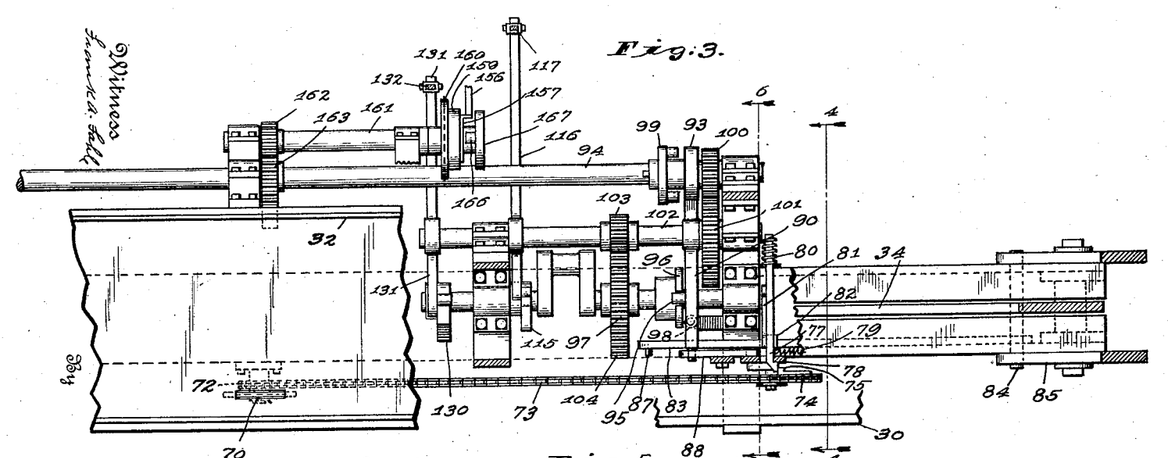
Fig. 3 a plan in partial horizontal section of a portion of the parts shown in Fig. 1.
Figure 4:
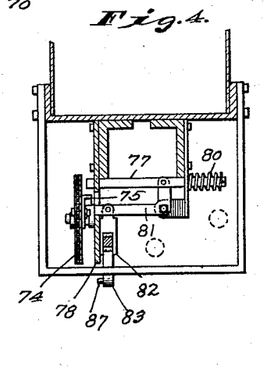
Fig. 4 a section on line 4—4 of Fig. 3.
Figure 5:
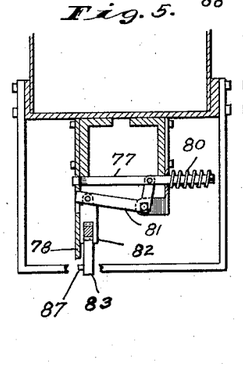
Fig. 5 a view similar to Fig. 4, with the parts in tripped position.

As the bale progresses in size it comes into contact with a toothed wheel 70, which is projected into the bottom of guide 32 and is carried by a shaft 71, which carries a sprocket wheel 72 over which is passed a chain 73. Chain 73 extends over a timing sprocket wheel 74 which carries a cam 75 and when the bale 76 has advanced sufficiently, this cam comes into contact with a latch 77 which is normally hooked into the eye of a plate 78 and yieldingly held in that position by a spring 79 (Fig. 1). As soon as the cam 75 shifts catch 77, the spring 80 acts upon latch 77 to retract it through plate 78 so as to swing the bell crank lever 81 to the position shown in Fig. 5, thus lifting yoke 82. The yoke 82 (Fig. 2) forms a support for the free end of a finger 83 which is pivoted at 84 to a lever 85 connected at 86 to the packer head 33 and this finger carries at its free end a pin 87 which normally misses the adjacent end of lever 88 but, when raised, as described, comes into contact with the shoulder 89 of said lever 88 so as to swing said lever to the position shown in dotted lines in Fig. 2.

Figure 6:
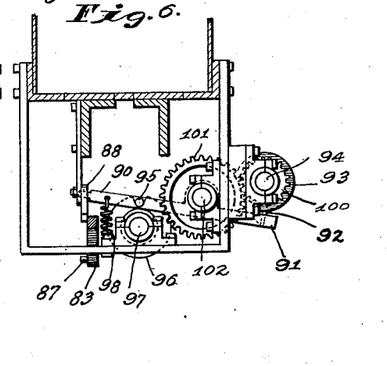
Fig. 6 a section on line 6—6 of Fig. 3.

When lever 88 swings to the position shown in dotted lines in Fig. 2, it swings lever 90 to the position shown in Fig. 6 and thus withdraws stop finger 91 from in front of a finger 92 carried by a clutch member 93 journaled upon the constantly moving shaft 94 and also withdraws pin 95 from a notch in a collar 96 carried by crank shaft 97. Lever 90 is normally urged to the position shown in Fig. 6 by a spring 98.

Figures 8, 9:
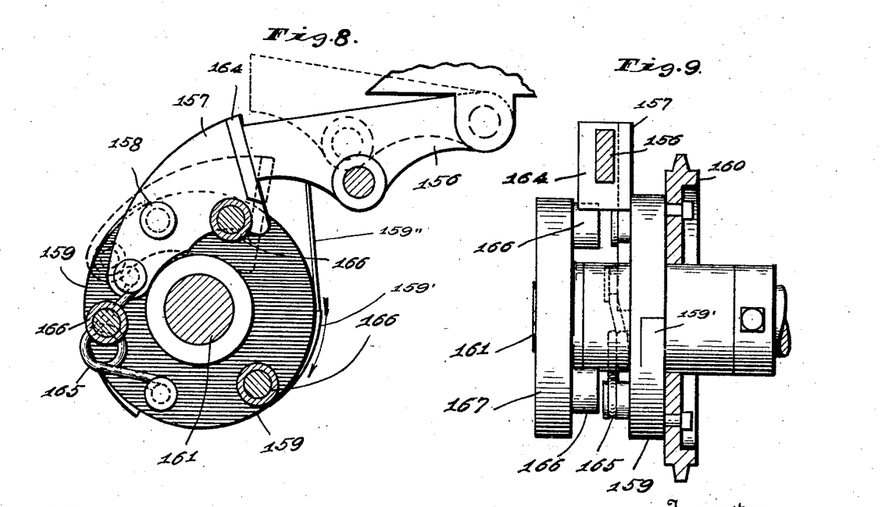

The finger 92, and the clutch of which it forms a part, is similar to the clutch shown in Figs. 8 and 9, which will be described later, and when lever 90 is shifted, as described, the clutch member 93, through finger 92, becomes connected with the clutch member 99 carried by shaft 94 so that gear 100, operating through gear 101, shaft 102, and gears 103 and 104, rotates crank shaft 97.

Figure 7:
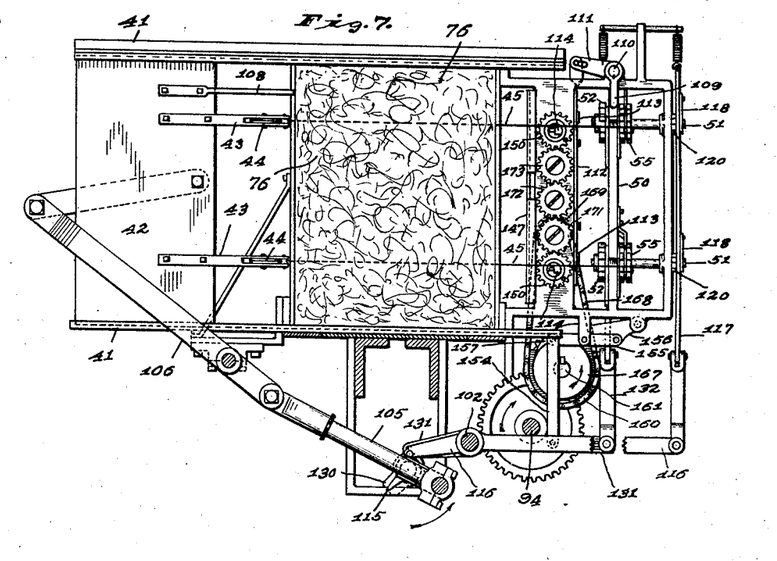
Fig. 7 a transverse section on line 7—7 of Fig. 1.
Figures 16, 18, 22:
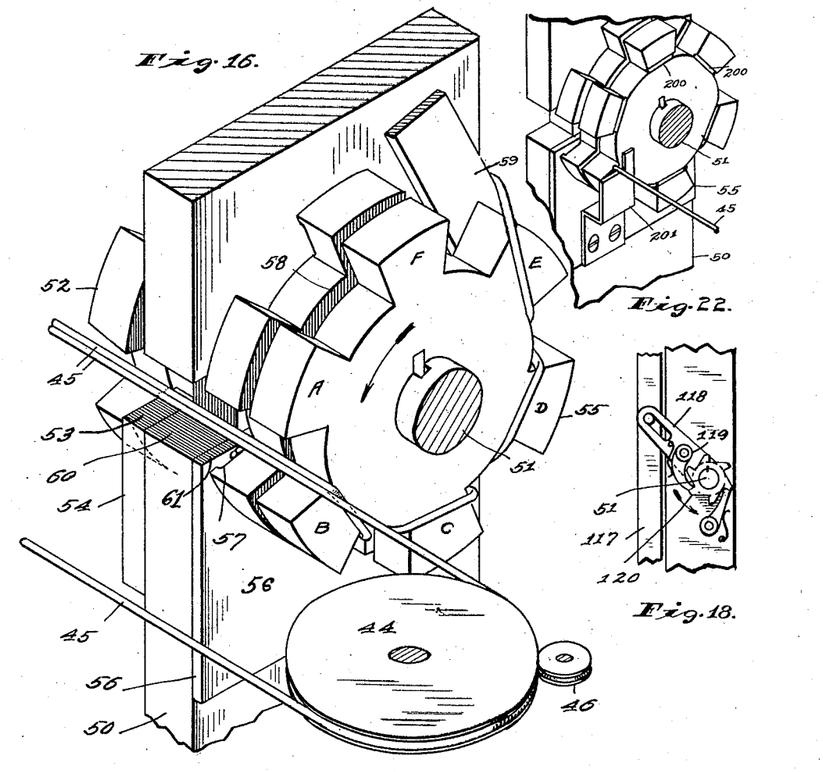

Crank shaft 97 acting through pitman 105 (Fig. 7) swings lever 106 so as to project plate 42 from the position shown in Fig. 7 to the position shown in Fig. 12, and thus projects wire 45 transversely across the completed bale and carries said wire through notches 53, 60 and 61, as indicated in Fig. 16.

Figure 11:
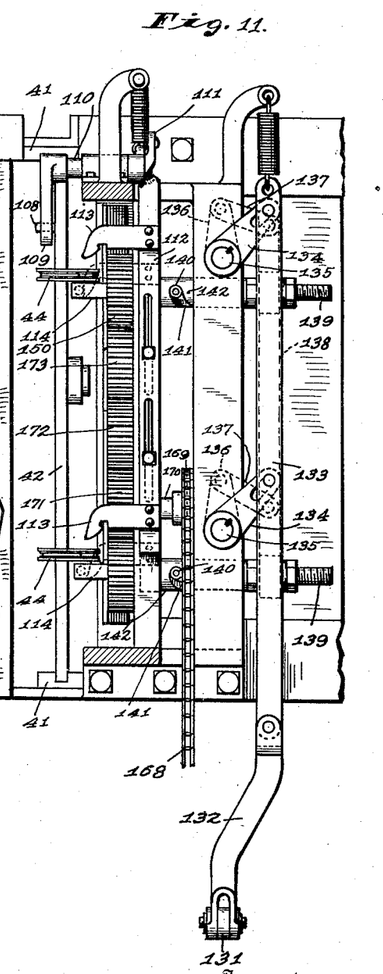
Fig. 11 an elevation in partial vertical section of the parts shown in Fig. 10;
Fig. 12 a fragmentary horizontal section through one of the twister heads.

When the plate 42 is projected to the position shown in Fig. 12, a finger 108 (Fig. 7) carried by said plate strikes a lever 109 carried by a rock shaft 110 and operates through arm 111 to move bar 112 (Figs. 7 and 11) downwardly, so as to bring fingers 113 down upon the two portions of wire 45, down upon the finger 114 of the twisting mechanism (Fig. 13) and when this occurs, a cam 115 on crank shaft 97, engages an arm 116 which pulls down upon bar 117.

Figure 10:
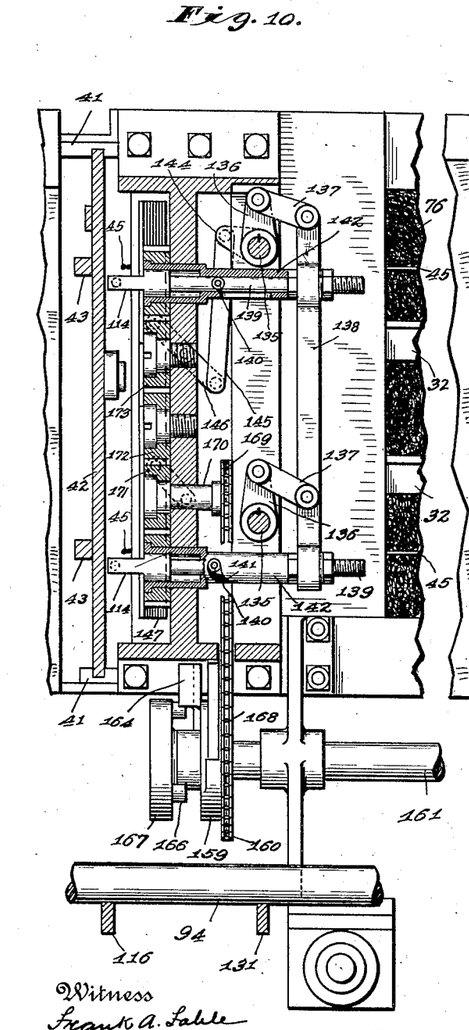
Fig. 10 a vertical sectional detail on a larger scale of the twisting mechanism and adjacent parts.

Connected to bar 117 are ratchet arms 118, carrying a pawls 119, which act upon ratchets 12, carried by shafts 51, (Fig. 18) so that said shafts, with cutters 52 and retainer heads 55, are advanced ⅙ of a rotation. Practically simultaneously with this movement, a cam 130, on shaft 97, engages a lever 131 which carries two links 132 and 133. Link 132 is connected to link 133 which in turn is connected to arms 134 carried by rock shafts 135, one for each twister mechanism, and these rock shafts carry arms 136 which are connected by links 137 with a cross head 138, said cross head being moved to the right from the position shown in Fig. 10, so as to shift shafts 139 of the twister mechanism axially.

Each of these shafts 139 carries a finger 114 and is provided with a pin 140 which lies in a spiral groove 141 in the tubular holder 142, so that, as these shafts 139 are shifted axially, they are also rotated so as to bring the pin 143 of each finger 114 first into the position shown in full lines in Fig. 13, and then into the position shown in dotted lines in said figure, so as to put a kink in the two portions of the wire 45 just before one of the cutter fingers of cutter 52 cuts the two wires over the edge of plate 54 at notch 53. One of the regular shafts 135 carries an arm 144 which is connected by link 145 and lever 146 with a bar 147 which is projected to the position shown in Fig.

13, so as to form an abutment for the two wires 45 and hold them in the position indicated in Fig. 13, so that those portions nearest the bale will be out of the path of movement of the severed ends of wire 45 when they are engaged and swung by the pin 149, carried by the twister gear 150.

Link 154 is connected by a lever 155 with a stop finger 156 which lies normally in position to engage and restrain a catch finger 157 (like catch finger 92). The catch finger 157 is pivoted at 158 on the clutch member 159 carried by a sprocket wheel 160 journaled on the constantly-moving shaft 161 which is connected by gears 162 and 163 with shaft 94 and this catch finger 157 is provided with a lateral projection 164 which, when the finger is restrained by the stop finger 156, is held, against the action of spring 165, out of the path of movement of a series of pins 166 carried by a clutch member 167 mounted on shaft 161, the arrangement being such that when, and so long as, stop finger 156 is in the position shown in dotted lines in Fig. 8, the lateral projection 164 will be engaged by one or another of pins 166 and sprocket wheel 160 will be rotated by shaft 161. Sprocket wheel 160 (Figs. 7 and 10) is connected by a chain 168 with a sprocket wheel 169 carried by a shaft 170 of an idler gear 171 which meshes with one of the twister gears 150 and with an idler gear 172 which meshes with an idler gear 173 meshing with the other twister gear 150, the arrangement being such that rotation of the sprocket wheel 160 will produce rotation of the twister gears 150 so as to wrap the free ends of the wire 45 around said wires, as indicated in Fig. 15, so as to tie the two wires together.

Cam 75 promptly passes latch 77 and the co-action between finger 83 and lever 88 draws yoke 82 downwardly against the action of spring 80, returning said yoke 82 and latch 77 to normal position, and as cams 115 and 130 promptly pass their respective levers 116 and 131, and as pin 95 rides upon the circumference of disk 96, it is apparent that, upon a complete rotation of crank shaft 97, the two clutches 93—99 and 160—167 will be automatically dissociated and when pin 95 drops into the notch of disk 96, the various parts are thus restored to normal inactive position, ready for another operation when the parts reach the position shown in Fig. 7.

The projection of wire 45 across the fourth side of the bale and the tying of the ends of the wire together by the loop shown in Fig. 15 takes place during a return stroke of the packer head 33 to the position shown in Fig. 1.

Figure 17:
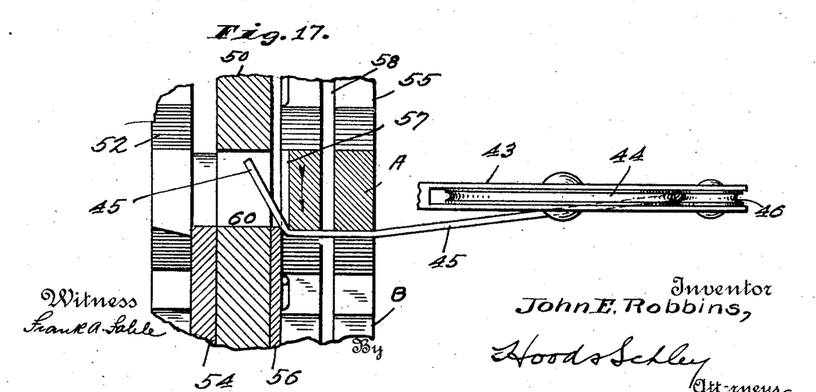

The advancement of shafts 51, brings one of the fingers of cutter 52 into position to sever the wires 45, as already described, and then brings one of the fingers (say A) of the holder 55 into engagement with said wires, bringing the freshly cut ends of said wires through the position shown in Fig. 17 carrying said wires up into the notches 57 and down alongside plate 56, so that on the return stroke of wheel 24, the wire 45 is looped around the finger A, as shown in Fig. 20, thus forming a firm anchorage for the wire preparatory to the formation of the next bale.

As the retainer head 55 advances step by step, the waste ends of wire 45 are ultimately brought into engagement with the stripper finger 39 and stripped off of the retainer fingers.

In Fig. 22, I show a slight modification from the construction shown in Figs. 16–21. In this form, the groove 200 is formed in the outer face of each tooth of wheel 55 at the root thereof, for the reception of the binding wire and a spring finger 201 is provided to cooperate with said wheel 55, so that the binding wire will be drawn down between wheel 55 and finger 201.

In order to prevent any backward movement of the clutch member 159, I provide said member with a plurality of ratchet teeth 159' (Fig. 8) engaged by a spring detent 159''.

I claim as my invention:

1. In a baler, the combination with a compression chamber, of means for supporting a binding wire across the mouth of said compression chamber, said means comprising a holder for the end of the wire, a holder for the wire supply, and tensioning means permitting the binding wire to be drawn from the supply and projected into the compression chamber while the bale is being formed, means for projecting material into the compression chamber and into engagement with the binding wire, means for projecting the binding wire across the mouth of the compression chamber to embrace the bale and to lay a portion of the binding wire alongside the end of said wire, means for holding the ends of said wire alongside of each other, means for engaging two adjacent portions of the wire between the bale and said holding means and initially kinking said two portions of the wire before cutting to hold the same against the expansion of the bale, means for cutting the wire beyond the kinks, and means for wrapping the two free ends of the wire about intermediate portions of the wire between the kinks and the bale.

2. In a baler, the combination with a compression chamber, of means for holding the end of a binding wire adjacent said chamber, means for holding said binding wire across the mouth of the chamber and for projecting said binding wire to embrace a bale so as to lay two portions of the binding wire adjacent each other, a finger arranged to engage two adjacent portions of the binding wire, means cooperating with said finger to produce kinks in said two portions of the wire prior to cutting, means for cutting the wire from its supply subsequent to the formation of said kinks, and a twister member formed to wrap the free ends of the wire around said finger and around adjacent portions of the binding wire between said finger and the bale.

3. In a baler, the combination with means for laying two portions of a bale-encompassing binding wire alongside each other and temporarily holding the same in that position, mechanism comprising a finger formed to hook over said adjacent portions of the wire and kink the same while under control of the holding means whereby the finger-restrained kink will resist expansion of the bale, means for cutting the binding wire from the holding means subsequent to the formation of said kink, and a rotatable member arranged to engage the free ends of said wire and wrap them around said finger and around intermediate portions of the wire between the finger and bale.

4. In a baler, the combination with means for laying two portions of a binding wire alongside each other and holding the same, of twister mechanism comprising an oscillatable laterally-movable finger adapted to hook over the adjacent portions of the wire, means cooperating with said finger to form a bale-restraining kink in said wire portions while held by the holding means, means for cutting said wire between the holding means and kink, and a rotatable twister head having a finger adapted to engage the free ends of the wire to wrap the same around the finger and around intermediate portions of the wire between the kink and bale.

5. In a baler, the combination with means for laying two portions of a binding wire alongside each other and holding the same, of a twister mechanism comprising a finger adapted to hook over adjacent portions of the binding wire, a support for said finger permitting axial and angular movement of the finger, means for producing simultaneous axial and angular movement of the finger, said finger cooperating with its support to produce a bale-restraining kink in the adjacent portions of the wire between the holding means and bale, means for cutting the wire from its supply subsequent to the formation of said kink, a twister wheel journaled on the support and provided with a pin adapted to engage the free ends of the wire and to wrap them around the finger and intermediate portions of the wire, and means for rotating said twister wheel subsequent to the cutter operation.

6. In a baler, wire-holding means comprising a plate over the end of which the wire is laid, a toothed wheel journaled adjacent said plate and formed to bend the wire over the edge of the plate and carry the same between the plate and a tooth of the toothed wheel, means for advancing said toothed wheel step by step, and means for wrapping the wire around the advanced tooth of the wheel and carrying the same back across the end of the plate.

7. In a baler, wire-holding means comprising a plate over the end of which the wire is laid, a toothed wheel journaled adjacent said plate and formed to bend the wire over the end of the plate and carry the same between the plate and a tooth of the toothed wheel, means for advancing said toothed wheel step by step, means for wrapping the wire around the advanced tooth of the wheel and carrying the same back across the end of the plate, and means for cutting the wire.

8. In a baler, the combination with the compression chamber, means for holding the end of a binding wire at one side of the chamber, a wire-engaging projector arranged to intermittently traverse the mouth of the chamber so as to project the wire across the chamber and across the end of a completed bale in the chamber, means for forming bale-restraining kinks in the two portions of the wire between the holder and bale, means for cutting the wire from the holding means and projector subsequent to kink formation, and means for twisting the free ends of the wire about intermediate portions of the wire.

9. In a baler, the combination with a compression chamber and a packing plunger cooperating therewith, of a wire projector arranged to traverse the mouth of the compression chamber, a wire clamp for holding one end of the wire, said wire clamp comprising a fingered wheel, a cooperating plate, and means for advancing said wheel step by step; a driving train for projecting said projector intermittently across the mouth of the compression chamber and back again, said driving train including a clutch; a clutch controller, a finger connected to the packing plunger for operating the clutch controller; a support for said finger shiftable to throw said finger into and out of an active path, means operable by said finger to operate the clutch controller; and timing mechanism for shifting said carrier, said timing mechanism comprising a member actuated by the bale.

10. In a baler, the combination with a compression chamber and a packing plunger cooperating therewith, of a wire projector arranged to traverse the mouth of the compression chamber, a wire clamp for holding one end of the wire, said wire clamp comprising a fingered wheel, a cooperating plate, and means for advancing said wheel step by step; a driving train for projecting said projector intermittently across the mouth of the compression chamber and back again, said driving train including a clutch; a clutch controller, a finger connected to the packing plunger for operating the clutch controller; a support for said finger shiftable to throw said finger into and out of an active path, means operable by said finger to operate the clutch controller; and timing mechanism for shifting said carrier.

11. In a baler, the combination with a compression chamber and a packing plunger cooperating therewith, of a wire projector arranged to traverse the mouth of the compression chamber, a wire clamp for holding one end of the wire, a driving train for projecting said projector intermittently across the mouth of the compression chamber and back again, said driving train including a clutch; a clutch controller, a finger connected to the packing plunger for operating the clutch controller; a support for said finger shiftable to throw said finger into and out of an active path, means operable by said finger to operate the clutch controller; and timing mechanism for shifting said carrier, said timing mechanism comprising a member actuated by the bale.

12. In a baler, the combination with a compression chamber and a packing plunger cooperating therewith, of a wire projector arranged to traverse the mouth of the compression chamber, a wire clamp for holding one end of the wire, a driving train for projecting said projector intermittently across the mouth of the compression chamber and back again, said driving train including a clutch; a clutch controller, a finger connected to the packing plunger for operating the clutch controller; a support for said finger shiftable to throw said finger into and out of an active path, means operable by said finger to operate the clutch controller; and timing mechanism for shifting said carrier.

13. In a baler, the combination of finger 83, carrier 82, clutch-controlling lever 88, latch 77, connections between said latch and carrier, means for intermittently returning the latch to retained position, and means for tripping said latch.

14. In a baler, the combination with means for holding the ends of a bale embracing wire and means for holding the bale, of wire-twisting means comprising a twisting finger axially and angularly movable, a finger 113 for engaging the wires between the twisting finger and the holder, means for actuating said finger 113, means for actuating the twister finger to form bale-restraining kinks in the wires between the bale and finger 113 before release by the holding means, means for cutting the wire between said finger 113 and the holding means subsequent to kink formation, and a twister head arranged to engage the cut ends of the wire and twist the same around the twister finger and around portions of the wire between the twister finger and bale.

15. In a baler, the combination with means for holding the ends of a bale embracing wire and means for holding the bale, of wire-twisting means comprising a twister finger, a finger 113 for engaging the wires between the twister finger and the holder, means for actuating said finger 113, means for actuating the twister finger to form bale-restraining kinks in the wires between the bale and finger 113, means for cutting the wire beyond said finger 113, and a twister head arranged to engage the cut ends of the wire and twist the same around the twister finger and around portions of the wire between the twister finger and bale.

In witness whereof, I have hereunto set my hand at Indianapolis, Indiana, this seventeenth day of May, A. D. one thousand nine hundred and twenty.

JOHN E. ROBBINS.